(12) United States Patent
Chen

(10) Patent No.: US 11,437,844 B1
(45) Date of Patent: Sep. 6, 2022

(54) BOOSTER FOR ENERGY STORAGE DEVICE

(71) Applicant: AERIS HOSPITALITY SOLUTIONS, LLC., City of Industry, CA (US)

(72) Inventor: Chi-Ting Chen, Tainan (TW)

(73) Assignee: Aeris Hospitality Solutions, LLC, City of Industry, CA (US)

( * ) Notice: Subject to any disclaimer, the term of this patent is extended or adjusted under 35 U.S.C. 154(b) by 0 days.

(21) Appl. No.: 17/467,930

(22) Filed: Sep. 7, 2021

(51) Int. Cl.
*H02J 3/00* (2006.01)
*H02J 3/02* (2006.01)
*H02J 7/35* (2006.01)
*H02J 3/38* (2006.01)
*H02J 7/00* (2006.01)
*H02J 7/34* (2006.01)

(52) U.S. Cl.
CPC ................ *H02J 7/35* (2013.01); *H02J 3/381* (2013.01); *H02J 7/0013* (2013.01); *H02J 7/345* (2013.01); *H02J 2300/22* (2020.01)

(58) Field of Classification Search
CPC .. H02J 7/35; H02J 3/381; H02J 7/0013; H02J 7/345; H02J 2300/22
See application file for complete search history.

(56) References Cited

FOREIGN PATENT DOCUMENTS

| TW | I239136 B | 9/2005 |
|---|---|---|
| TW | 201315126 | * 4/2013 |

* cited by examiner

*Primary Examiner* — Toan T Vu
(74) *Attorney, Agent, or Firm* — Rosenberg, Klein & Lee

(57) ABSTRACT

A booster for energy storage device includes an H-bridge circuit, a waveform generator, a first capacitor, a second capacitor, and a power storage unit. Through a pulse wave to control the H-bridge circuit, electric energy is stored in the first capacitor and the second capacitor by turns. When the sum of the voltages of the first capacitor and the second capacitor is greater than a storage voltage, the electric energy is stored to the power storage unit. Thus, there is no need for starting current, and the utilization of the solar panel can be improved in a low-loss manner.

7 Claims, 2 Drawing Sheets

BOOSTER FOR ENERGY STORAGE DEVICE

FIELD OF THE INVENTION

The present invention relates to a solar energy storage device, and more particularly to a booster for energy storage device that can improve efficiency.

BACKGROUND OF THE INVENTION

A solar charging structure is a combination of solar panels and cells. When solar energy is used as a power source, the voltage of the solar panel needs to be higher than the voltage of the cell. When the voltage of the solar panel is lower than the voltage of the cell, the solar panel cannot charge the cell, so the solar charging device is in an idle state.

In this regard, there are various ways to boost the voltage of the solar panel, such as a step-up transformer, which mainly uses high-frequency frequency applied to the primary side of the high-frequency transformer, and the corresponding ratio of voltage can be obtained on the secondary side.

Specifically, for example. Taiwan Patent Publication No. 1239136 discloses a high-efficiency and high-boost converter with reduced switching withstand voltage performance. It mainly uses three-winding coupled inductors to convert the low output voltage of traditional batteries, fuel cells, solar power generation and wind power generation into high-voltage DC power supply systems to increase energy efficiency.

However, transformers or boost circuits with coupled inductors, such as the aforementioned patent, require 200% of the starting current, so that the starting current will be more than 2 times the working current, and it only provides 50% power efficiency.

SUMMARY OF THE INVENTION

According to one aspect of the present invention, a booster for energy storage device, used for storing electric energy from a solar panel, is provided. The booster for energy storage device comprises an H-bridge circuit, including a first conduction path and a second conduction path that are electrically connected to the solar panel, the first conduction path and the second conduction path being controlled by a pulse wave to be selectively conducted; a waveform generator, having a first output terminal and a second output terminal, the first output terminal being electrically connected to one end of the first conduction path, the second output terminal being electrically connected to one end of the second conduction path, the waveform generator outputting the pulse wave; a first capacitor, electrically connected to another end of the first conduction path; a second capacitor, electrically connected to another end of the second conduction path and a negative terminal of the first capacitor; and a power storage unit, electrically connected to a positive terminal of the first capacitor and a negative terminal of the second capacitor, the power storage unit having a storage voltage. Through the pulse wave output by the waveform generator, the first output terminal and the second output terminal output a high potential of the pulse wave by turns. When the first output terminal outputs the high potential, the first conduction path is turned on, and the electric energy from the solar panel is stored to the first capacitor through the first conduction path. When the second output terminal outputs the high potential, the second conduction path is turned on, and the electric energy from the solar panel is stored to the second capacitor through the second conduction path. When the sum of the voltages of the first capacitor and the second capacitor is greater than the storage voltage, the electric energy stored in the first capacitor and the second capacitor is transferred to the power storage unit for storage.

Preferably, the booster for energy storage device further comprises a switch unit. The first capacitor is electrically connected to the power storage unit via the switch unit. The H-bridge circuit has a voltage feedback element electrically connected to the switch unit. The voltage feedback element controlling the switch unit to be turned on according to a comparison between the storage voltage and a reference voltage.

Preferably, the switch unit is a field effect transistor, and the voltage feedback element is a voltage comparator. A negative input terminal of the voltage feedback element is electrically connected to a source of the switch unit. A positive input terminal of the voltage feedback element is connected to the reference voltage. An output terminal of the voltage feedback element is electrically connected to a gate of the switch unit. The first capacitor is electrically connected to a drain of the switch unit.

Preferably, the H-bridge circuit includes a plurality of H-bridge circuits that are connected in parallel. The negative input terminal of the voltage feedback element of at least one of the H-bridge circuits is electrically connected to the power storage unit to obtain the storage voltage.

Preferably, the first conduction path includes a first field effect transistor and a second field effect transistor. The second conduction path includes a third field effect transistor and a fourth field effect transistor. The solar panel is electrically connected to a drain of the first field effect transistor and a drain of the third field effect transistor. The first output terminal is electrically connected to a gate of the first field effect transistor and a gate of the second field effect transistor. The second output terminal is electrically connected to a gate of the third field effect transistor and a gate of the fourth field effect transistor. A source of the first field effect transistor is electrically connected to the positive terminal of the first capacitor. A source of the second field effect transistor is electrically connected to a source of the fourth field effect transistor. A source of the third field effect transistor and a drain of the second field effect transistor are electrically connected to the negative terminal of the first capacitor. A drain of the fourth field effect transistor is electrically connected to the negative terminal of the second capacitor.

Preferably, the booster for energy storage device further comprises a first resistor and a first resistor. One end of the first resistor is electrically connected to the positive terminal of the first capacitor. Another end of the first resistor is electrically connected to the negative terminal of the first capacitor and one end of the second resistor. Another end of the second resistor is electrically connected to the negative terminal of the second capacitor.

According to another aspect of the present invention, a booster for energy storage device is provided. The booster for energy storage device comprises a solar panel; an H-bridge circuit, including a first conduction path and a second conduction path that are electrically connected to the solar panel, the first conduction path and the second conduction path being controlled by a pulse wave to be selectively conducted; a waveform generator, having a first output terminal and a second output terminal, the first output terminal being electrically connected to one end of the first conduction path, the second output terminal being electrically connected to one end of the second conduction path, the waveform generator outputting the pulse wave; a first capacitor, electrically connected to another end of the first conduction path; a second capacitor, electrically connected to another end of the second conduction path and a negative terminal of the first capacitor; and a power storage unit, electrically connected to a positive terminal of the first capacitor and a negative terminal of the second capacitor, the power storage unit having a storage voltage. Through the pulse wave output by the waveform generator, the first output terminal and the second output terminal output a high potential of the pulse wave by turns. When the first output terminal outputs the high potential, the first conduction path is turned on, and electric energy from the solar panel is stored to the first capacitor through the first conduction path. When the second output terminal outputs the high potential, the second conduction path is turned on, and the electric energy from the solar panel is stored to the second capacitor through the second conduction path. When the sum of the voltages of the first capacitor and the second capacitor is greater than the storage voltage, the electric energy stored in the first capacitor and the second capacitor is transferred to the power storage unit for storage.

According to the above technical features, the following effects can be achieved:

1. Through the H-bridge circuit, the first capacitor and the second capacitor, the voltage of the solar panel in low light conditions can be easily boosted to be higher than the storage voltage of the power storage unit, and the power is stored in the power storage unit, thereby improving the utilization of the solar panel.

2. As long as the sum of the voltages of the first capacitor and the second capacitor is greater than the storage voltage, the power can be stored in the power storage unit. The present invention does not require any starting current. The present invention adopts the principle of high-frequency power accumulative boost to boost the voltage in a low-loss manner.

3. In the present invention, the H-bridge circuit divides the direct current into two conduction paths to charge the first capacitor and the second capacitor, respectively. Then, the first capacitor and the second capacitor are connected in series instantaneously and discharged to the power storage unit at the same time. For the capacitive boost applied to AC power supply, multiple capacitors charge each other in sequence. Compared with the capacitive boost, the present invention is particularly suitable for the DC power supply of solar panels.

DETAILED DESCRIPTION OF THE PREFERRED EMBODIMENTS

Embodiments of the present invention will now be described, by way of example only, with reference to the accompanying drawings.

Figure 1:
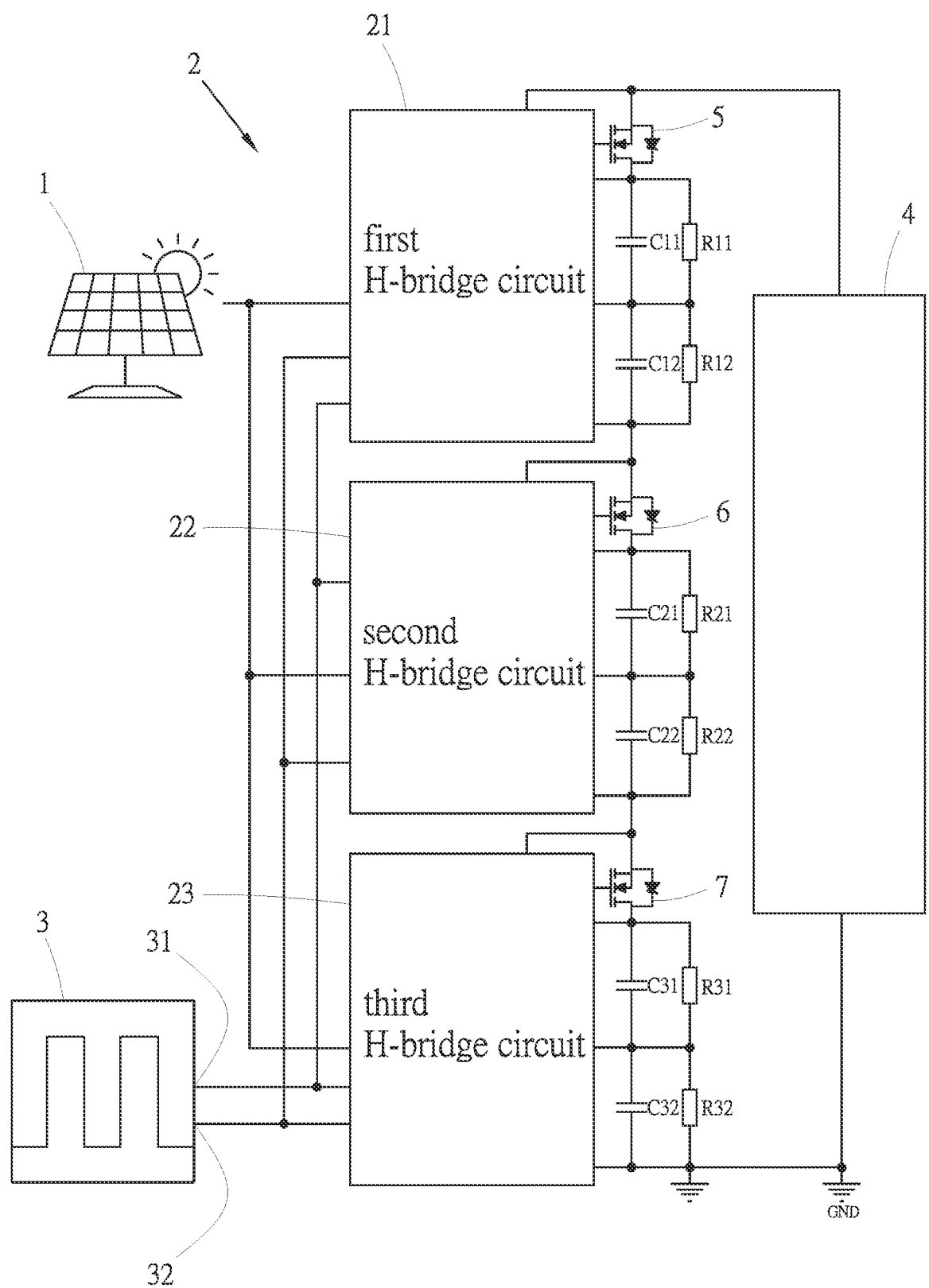
FIG. 1 is a first schematic view according to an embodiment of the present invention, showing that the first H-bridge circuit, the second H-bridge circuit and the third H-bridge circuit are connected in parallel with each other.
Figure 2:
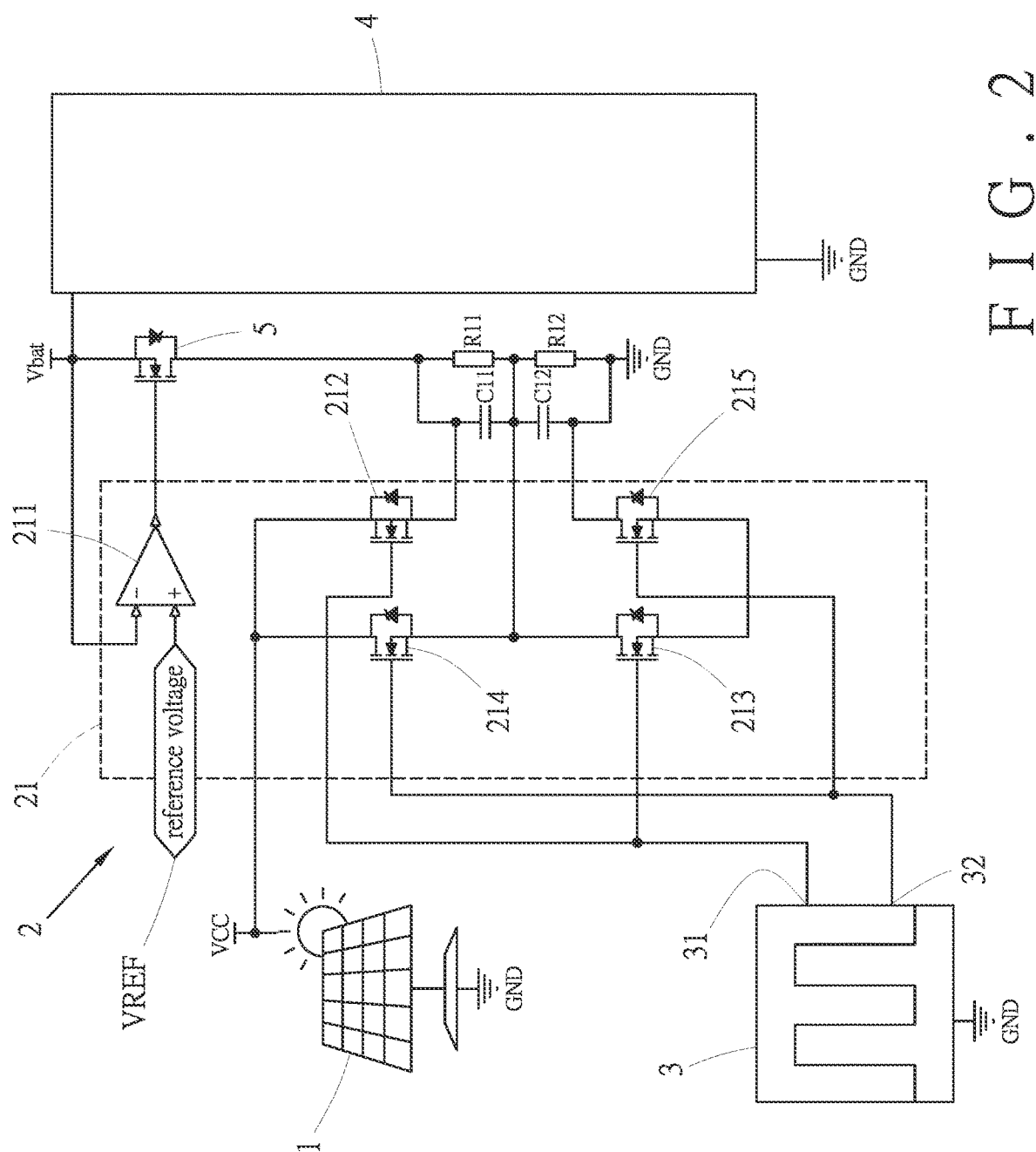
FIG. 2 is a second schematic view according to an embodiment of the present invention, showing the internal circuit of the first H-bridge circuit.

Referring to FIG. 1 and FIG. 2, a booster for energy storage device according to an embodiment of the present invention comprises a solar panel 1, an H-bridge circuit 2, a waveform generator 3, a power storage unit 4, a first switch unit 5, a second switch unit 6, a third switch unit 7, three first capacitors C11, C21, C31, three second capacitors C12, C22, C32, three first resistors R11, R21, R31, and three second resistors R12, R22, R32.

In actual implementation, the booster for energy storage device may not include the solar panel 1, but the booster for energy storage device is electrically connected to the solar panel 1, or other power sources, such as hydroelectric generators or wind generators, etc. The booster for energy storage device described below includes the solar panel 1.

The H-bridge circuit 2 is electrically connected to the solar panel 1. The H-bridge circuit includes a first H-bridge circuit 21, a second H-bridge circuit 22 and a third H-bridge circuit 23 that are connected in parallel with each other.

It should be particularly noted that in order to more clearly show the connection relationship of the internal components of the H-bridge circuit 2, only the first H-bridge circuit 21, the first capacitor C11, the second capacitor C12, the first resistor R11 and the second resistor R12 are shown in FIG. 2. The other parts, the second H-bridge circuit 22 and the third H-bridge circuit 23 in FIG. 1, are not shown in FIG. 2.

The first H-bridge circuit 21, the second H-bridge circuit 22 and the third H-bridge circuit 23 each have a first conduction path and a second conduction path that are electrically connected to the solar panel 1, and have a voltage feedback element 211.

The following description only illustrates and explains the first H-bridge circuit 21. The internal circuits of the second H-bridge circuit 22 and the third H-bridge circuit 23 are similar to those of the first H-bridge circuit 21, and won't be described herein. The voltage feedback element 211 is electrically connected to the first switch unit 5. The first conduction path includes a first field effect transistor 212 and a second field effect transistor 213. The second conduction path includes a third field effect transistor 214 and a fourth field effect transistor 215.

The waveform generator 3 has a first output terminal 31 and a second output terminal 32 that are electrically connected to the first H-bridge circuit 21, respectively. The first output terminal 31 is electrically connected to one end of the first conduction path, and the second output terminal 32 is electrically connected to one end of the second conduction path. The waveform generator 3 outputs a pulse wave. The first conduction path and the second conduction path are selected and controlled by the pulse wave.

In more detail, the solar panel 1 is electrically connected to a drain of the first field effect transistor 212 and a drain of the third field effect transistor 214. The first output terminal 31 is electrically connected to a gate of the first field effect transistor 212 and a gate of the second field effect transistor 213. The second output terminal 32 is electrically connected to a gate of the third field effect transistor 214 and a gate of the fourth field effect transistor 215. A source of the second field effect transistor 213 is electrically connected to a source of the fourth field effect transistor 215.

The first capacitor C1$i$ is electrically connected to the other end of the first conduction path. The second capacitor C12 is electrically connected to the other end of the second conduction path and a negative terminal of the first capacitor C11. In other words, a source of the first field effect transistor 212 is electrically connected to a positive terminal of the first capacitor C11. A source of the third field effect transistor 214 and a drain of the second field effect transistor 213 are electrically connected to the negative terminal of the first capacitor C11. A drain of the fourth field effect transistor 215 is electrically connected to a negative terminal of the second capacitor C12.

One end of the power storage unit 4 is electrically connected to the positive terminal of the first capacitor C11 through the first switch unit 5. The other end of the power storage unit 4 is electrically connected to the negative terminal of the second capacitor C12. The power storage unit 4 further has a storage voltage Vbat.

One end of the first resistor R11 is electrically connected to the positive terminal of the first capacitor C11. The other end of the first resistor R11 is electrically connected to the negative terminal of the first capacitor C11 and one end of the second resistor R12. The other end of the second resistor R12 is electrically connected to the negative terminal of the second capacitor C12. Preferably, the resistance values of the first resistor R11 and the second resistor R12 may be set to be consistent with the internal resistances of the first capacitor C11 and the second capacitor C12, respectively.

In a preferred embodiment of the present invention, the first switch unit 5 is a field effect transistor, and the voltage feedback element 211 is a voltage comparator. A negative input terminal of the voltage feedback element 211 is electrically connected to a source of the first switch unit 5. A positive input terminal of the voltage feedback element 211 is connected to a reference voltage VREF. An output terminal of the voltage feedback element 211 is electrically connected to a gate of the first switch unit 5. The first capacitor C11 is electrically connected to a drain of the first switch unit 5. Preferably, the reference voltage VREF is the sum of the voltages of the first capacitor C11 and the second capacitor C12.

The first H-bridge circuit 21, the second H-bridge circuit 22 and the third H-bridge circuit 23 are connected in parallel, as shown in FIG. 1.

The first output terminal 31 and the second output terminal 32 of the waveform generator 3 are electrically connected to the first H-bridge circuit 21, the second H-bridge circuit 22 and the third H-bridge circuit 23, respectively. The first H-bridge circuit 21, the second H-bridge circuit 22 and the third H-bridge circuit 23 have the respective corresponding first capacitors C11, C21, C31, the second capacitors C12, C22, C32, the first resistors R11, R21, R31, and the second resistors R12, R22, R32. The first H-bridge circuit 21 is electrically connected to the first switch unit 5. The second H-bridge circuit 22 is electrically connected to the second switch unit 6. The third H-bridge circuit 23 is electrically connected to the third switch unit 7. The second switch unit 6 and the third switch unit 7 are also field-effect transistors.

The power storage unit 4 is electrically connected to the first capacitor C11 corresponding to the first H-bridge circuit 21 and the second capacitor C32 corresponding to the third H-bridge circuit 23. The negative input terminal of the voltage feedback element 211 of at least the first H-bridge circuit 21 is electrically connected to the power storage unit 4 to obtain the storage voltage Vbat.

In the preferred embodiment of the present invention, a 6-fold boost is taken as an example, and the first H-bridge circuit 21, the second H-bridge circuit 22 and the third H-bridge circuit 23 are used. In actual implementation, a fourth H-bridge circuit, a fifth H-bridge circuit and the like may be reduced or continuously added to cope with low light conditions.

As to the operation of the booster for energy storage device, only the first H-bridge circuit 21 is described below. The operations of the second H-bridge circuit 22 and the third H-bridge circuit 23 are similar to that of the first H-bridge circuit 21, and won't be described herein.

First, the waveform generator 3 outputs the pulse wave to the first H-bridge circuit 21, so that the first output terminal 31 and the second output terminal 32 output a high potential of the pulse wave by turns, and the solar panel 1 inputs electric energy to the first H-bridge circuit 21.

When the first output terminal 31 outputs the high potential, the first conduction path is turned on, and the electric energy from the solar panel 1 is stored to the first capacitor C11 through the first field effect transistor 212.

When the second output terminal 32 outputs the high potential, the second conduction path is turned on, and the electric energy from the solar panel 1 is stored to the second capacitor C12 through the third field effect transistor 214.

The first capacitor C11 and the second capacitor C12 are continuously charged by turns. At this time, the voltage feedback element 211 controls the first switch unit 5 to be turned on according to the comparison between the storage voltage Vbat and the reference voltage VREF. In actual implementation, the voltage feedback element 211 may control the first switch unit 5 to be turned on via a control unit (not shown).

When the sum of the voltages of the first capacitor C11 and the second capacitor C12 is greater than the storage voltage Vbat and the first switch unit 5 is turned on, the first capacitor C11 and the second capacitor C12 are instantly connected in series, and the electric energy stored in the first capacitor C11 and the second capacitor C12 is transferred to the power storage unit 4 via the first switch unit 5 for storage, without any starting current.

The booster for energy storage device adopts the principle of high-frequency power accumulative boost. Through the H-bridge circuit 2, the first capacitors C11, C21, C31 and the second capacitors C12, C22, C32, the voltage of the solar panel 1 in low light conditions can be easily boosted to be higher than the storage voltage V bat of the power storage unit 4 in a low-loss manner, and the power is stored in the power storage unit 4, thereby improving the utilization of the solar panel 1. Through the first switch unit 5, the solar panel 1 can be prevented from being short-circuited for a long time under extremely low light conditions, and the service life of the solar panel 1 can be prolonged.

For the capacitive boost applied to AC power supply (such as AC charge pump boost circuit), multiple capacitors are charged in sequence. One capacitor is fully charged, and then the next capacitor is charged. The required boost multiple is reached until all capacitors are fully charged, which is only suitable for alternating current. For the capacitive boost applied to DC power supply (such as DC charge pump boost circuit), the capacitors are charged in series, and the boost effect is achieved through multiple charging and discharging. Therefore, compared to the capacitive boost, the booster for energy storage device of the present invention is particularly suitable for the DC power supply of the solar panel 1. Moreover, the present invention adjusts the number of the first capacitors C11, C21, C31 and the second capacitors C12, C22, C32, in cooperation with the corresponding H-bridge circuit 2, only two charging steps are required to reach the desired boost multiple, such as six-fold boost as shown in FIG. 1.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A booster for energy storage device, used for storing electric energy from a solar panel, the booster for energy storage device comprising:
   an H-bridge circuit, including a first conduction path and a second conduction path that are electrically connected to the solar panel, the first conduction path and the second conduction path being controlled by a pulse wave to be selectively conducted;
   a waveform generator, having a first output terminal and a second output terminal, the first output terminal being electrically connected to one end of the first conduction path, the second output terminal being electrically connected to one end of the second conduction path, the waveform generator outputting the pulse wave;
   a first capacitor, electrically connected to another end of the first conduction path;
   a second capacitor, electrically connected to another end of the second conduction path and a negative terminal of the first capacitor; and
   a power storage unit, electrically connected to a positive terminal of the first capacitor and a negative terminal of the second capacitor, the power storage unit having a storage voltage;
   wherein through the pulse wave output by the waveform generator, the first output terminal and the second output terminal output a high potential of the pulse wave by turns;
   wherein when the first output terminal outputs the high potential, the first conduction path is turned on, and the electric energy from the solar panel is stored to the first capacitor through the first conduction path;
   wherein when the second output terminal outputs the high potential, the second conduction path is turned on, and the electric energy from the solar panel is stored to the second capacitor through the second conduction path;
   wherein when the sum of the voltages of the first capacitor and the second capacitor is greater than the storage voltage, the electric energy stored in the first capacitor and the second capacitor is transferred to the power storage unit for storage.

2. The booster for energy storage device as claimed in claim 1, further comprising a switch unit, the first capacitor being electrically connected to the power storage unit via the switch unit, the H-bridge circuit having a voltage feedback element electrically connected to the switch unit, the voltage feedback element controlling the switch unit to be turned on according to a comparison between the storage voltage and a reference voltage.

3. The booster for energy storage device as claimed in claim 2, wherein the switch unit is a field effect transistor, the voltage feedback element is a voltage comparator; a negative input terminal of the voltage feedback element is electrically connected to a source of the switch unit, a positive input terminal of the voltage feedback element is connected to the reference voltage, an output terminal of the voltage feedback element is electrically connected to a gate of the switch unit, and the first capacitor is electrically connected to a drain of the switch unit.

4. The booster for energy storage device as claimed in claim 3, wherein the H-bridge circuit includes a plurality of H-bridge circuits that are connected in parallel, and the negative input terminal of the voltage feedback element of at least one of the H-bridge circuits is electrically connected to the power storage unit to obtain the storage voltage.

5. The booster for energy storage device as claimed in claim 1, wherein the first conduction path includes a first field effect transistor and a second field effect transistor, the second conduction path includes a third field effect transistor and a fourth field effect transistor; the solar panel is electrically connected to a drain of the first field effect transistor and a drain of the third field effect transistor, the first output terminal is electrically connected to a gate of the first field effect transistor and a gate of the second field effect transistor, the second output terminal is electrically connected to a gate of the third field effect transistor and a gate of the fourth field effect transistor, a source of the first field effect transistor is electrically connected to the positive terminal of the first capacitor, a source of the second field effect transistor is electrically connected to a source of the fourth field effect transistor, a source of the third field effect transistor and a drain of the second field effect transistor are electrically connected to the negative terminal of the first capacitor, a drain of the fourth field effect transistor is electrically connected to the negative terminal of the second capacitor.

6. The booster for energy storage device as claimed in claim 1, further comprising a first resistor and a first resistor, one end of the first resistor being electrically connected to the positive terminal of the first capacitor, another end of the first resistor is electrically connected to the negative terminal of the first capacitor and one end of the second resistor, and another end of the second resistor is electrically connected to the negative terminal of the second capacitor.

7. A booster for energy storage device, comprising:
   a solar panel;
   an H-bridge circuit, including a first conduction path and a second conduction path that are electrically connected to the solar panel, the first conduction path and the second conduction path being controlled by a pulse wave to be selectively conducted;
   a waveform generator, having a first output terminal and a second output terminal, the first output terminal being electrically connected to one end of the first conduction path, the second output terminal being electrically connected to one end of the second conduction path, the waveform generator outputting the pulse wave;
   a first capacitor, electrically connected to another end of the first conduction path;
   a second capacitor, electrically connected to another end of the second conduction path and a negative terminal of the first capacitor; and
   a power storage unit, electrically connected to a positive terminal of the first capacitor and a negative terminal of the second capacitor, the power storage unit having a storage voltage;
   wherein through the pulse wave output by the waveform generator, the first output terminal and the second output terminal output a high potential of the pulse wave by turns;
   wherein when the first output terminal outputs the high potential, the first conduction path is turned on, and electric energy from the solar panel is stored to the first capacitor through the first conduction path;
   wherein when the second output terminal outputs the high potential, the second conduction path is turned on, and the electric energy from the solar panel is stored to the second capacitor through the second conduction path;
   wherein when the sum of the voltages of the first capacitor and the second capacitor is greater than the storage voltage, the electric energy stored in the first capacitor and the second capacitor is transferred to the power storage unit for storage.

* * * * *